United States Patent [19]

Nagoshi

[11] 4,297,023

[45] Oct. 27, 1981

[54] ELECTROPHOTOGRAPHIC COPYING APPARATUS

[75] Inventor: Mitsuru Nagoshi, Hachioji, Japan

[73] Assignee: Konishiroku Photo Industry Co., Ltd., Tokyo, Japan

[21] Appl. No.: 61,053

[22] Filed: Jul. 26, 1979

[30] Foreign Application Priority Data

Jul. 31, 1978 [JP] Japan .................................. 53-93449

[51] Int. Cl.[3] ...................... G03G 15/28; G03B 27/62

[52] U.S. Cl. .......................................... 355/8; 355/75

[58] Field of Search ............................ 355/3 R, 8, 75

[56] References Cited

U.S. PATENT DOCUMENTS 3,635,554 1/1972 Hodges .................................. 355/8
4,012,138 3/1977 Washio et al. .......................... 355/8
4,084,898 4/1978 Kurita .................................... 355/8
4,124,288 11/1978 Zeuthen .................................. 355/8
4,129,374 12/1978 Uchida et al. .......................... 355/8

*Primary Examiner*—Fred L. Braun
*Attorney, Agent, or Firm*—Bierman & Bierman

[57] ABSTRACT

An electrophotographic copying apparatus having a copy board operatively movable along a path is provided with apparatus for releasably coupling the copy board to driving elements therefor including an endless power transmitting chain driven during operation of the copying apparatus, an intermediator having a closed vertical slot for nonreleasably receiving slidably within the slot engaging structure on the chain for carrying the intermediator during driven movement of the chain, and coupling structure releasably coupling the intermediator and the copy board for normally effecting movement of the board along its path by driven movement of the power transmitting chain.

4 Claims, 11 Drawing Figures

ELECTROPHOTOGRAPHIC COPYING APPARATUS

BACKGROUND OF THE INVENTION

1. Field of the Invention

The present invention relates to an electrophotographic copying apparatus of an arrangement in which a copy board carrying an original to be copied is reciprocatably moved relative to a main body of the copying apparatus and adapted to cooperate with an optical system provided at a fixed position in the apparatus thereby to produce a latent image of the original to be copied on a photosensitive medium. More particularly, the present invention concerns a mechanism for releasably coupling the copy board to a driving mechanism or system therefor.

Although the mechanism or apparatus according to the invention can be effectively applied to copying apparatus either of the image transfer or electrofax type, it is assumed in the following description for convenience of illustration that the invention is applied to copying apparatus in which the image transfer process is carried out.

2. Description of the Prior Art

As is well known, a drum-like light sensitive medium is increasingly employed as the latent image forming medium in commercially available copying apparatus in an attempt to reduce the size of the copying apparatus and/or enhance the operating performance thereof. The drum-like light sensitive medium is usually implemented in one of at least three configurations described below:

In the first configuration, an electrically conductive drum surface formed of aluminum or the like is wholly coated with a photo-electric semiconductor layer such as selenium, cadmium sulfide or the like. The drum of this type is referred to as the demand type light sensitive drum.

In the case of the second configuration, a predetermined zone of the drum surface is covered with a web-like light sensitive sheet formed of zinc oxide. The web-like light sensitive sheet is wound on a supply spool and dispensed progressively for use, to be finally wound up by a take up spool.

According to the third configuration, a sheet-like sensitive paper is detachably applied onto the drum surface at a predetermined region and replaced by a fresh sheet after a predetermined number of repeated uses.

However, in hitherto known copying apparatus in which the drum of the third configuration described above is employed, the replacement of the light sensitive sheet requires extraction of the drum outwardly from the copying apparatus, involving time-consuming and troublesome procedures, because the drum is positioned within the main body of the copying apparatus with a high accuracy and is surrounded by a number of various processing or treating means.

As an attempt to solve the above problem, it is conceivable that a machine frame (a top plate positioned below the copy board) be releasably mounted to the main body of the apparatus. For replacement of the light sensitive sheet, a printing button switch is actuated to move the copy board for a predetermined distance. Thereafter, the top plate is removed to allow the replacement of the light sensitive sheet through the now available opening. However, because a main switch must be turned off in the course of actuation of the printing button in order to stop the copy board, a troublesome procedure is involved. Furthermore, the charging electrode and the irradiating lamp are energized during the movement of the copy board. Accordingly, when the main switch is turned on again after the replacement of the light sensitive sheets, the charging electrode and the irradiating lamp are again energized, as a result of which electric energy is consumed wastefully during each replacement of the light sensitive sheet. Where the copied paper (sometimes referred to as the transfer sheet or copy sheet) is discharged from a top portion of the copying apparatus (irrespective of the configuration of the light sensitive drum) as is shown in FIG. 1, the copy sheet is difficult to remove forwardly of the apparatus when jamming occurs in the region between an image transferring station and a sheet discharging station. It is a fact that the more compact the machine is, the more difficult is sheet removal. Of course, the jammed copy sheet may be taken out after removal of the top plate. However, in this case, a similarly troublesome procedure as those required for the replacement of the light sensitive sheets is disadvantageously involved. The above also applies to replacement of the exposure lamp L.

The disadvantages of the hitherto known apparatus are obviously ascribable to the configuration of the light sensitive drum as well as the location of the sheet discharging portion. And it is also true that the coupling mechanism between the copy board and the driving system provides a cause for such disadvantage. In this connection, it is noted that in the case of prior art copying apparatus, a pulley having a diameter substantially equal to that of the drum is mounted on the supporting shaft for the drum. A steel cord having an end secured to a front portion of the copy board is reeled around the pulley for a predetermined length with the other end of the cord being secured to a rear end portion of the copy board. An electromagnetic clutch is interposed in the driving system including the pulley and the steel cord, whereby the reciprocation of the copy board is controlled by means of the magnetic clutch. With such arrangement, the free movement of the copy board is considerably restricted. In addition, even if an optimum tension is applied to the cord at the time of assemblying the copying apparatus, the copy board may possibly exhibit unstable movement at a variable speed at a starting point of the copying operation, making highly accurate control difficult.

SUMMARY OF THE INVENTION

An object of the invention is to eliminate the disadvantages of hitherto known copying apparatus having a movable copy board such as described above.

In the following, description will be made on exemplary embodiments of the invention by referring to the accompanying drawings.

BRIEF DESCRIPTION OF THE DRAWINGS

In the accompanying drawings.

DETAILED DESCRIPTION OF THE PREFERRED EMBODIMENTS

Figure 1:
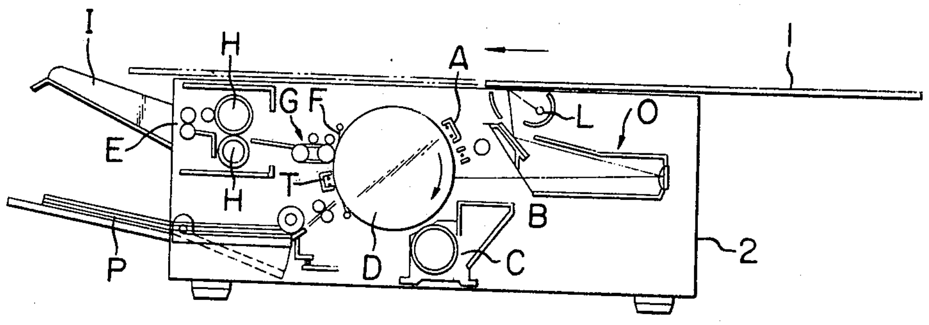
FIG. 1 shows schematically a general arrangement of an image transfer type electrophotographic copying apparatus having a movable original carriage.

In FIG. 1, reference numeral 1 denotes a copy board which is disposed at the top of the copying machine for supporting and carrying an original to be copied and adapted to be reciprocated under control. The board is represented by a solid line at the position ready for initiating the copying operation, while the end position of the forward movement thereof is indicated by a double-dotted broken line. The length of the copy board 1 is selected shorter than the length of the main body 2 of the copying machine, so that the copy board does not extend beyond the confines of the machine body for convenience of packaging. Since the copy board is mounted freely movable, as will be described hereinafter, a stopper or restricting means (not shown) is provided on the machine frame to restrict the movement of the copy board within a predetermined range. Reference letter D denotes a supporting means such as a drum for supporting a light sensitive paper thereon and which is coupled to a suitable driving system to be rotated in the direction indicated by an arrow. The drum D, for example, is implemented in the third configuration described hereinbefore; that is, the peripheral surface of the drum is covered by a light sensitive sheet or paper in a predetermined zone. Additionally, among the top plates of the machine body 2, the one which lies above the light sensitive drum D is mounted so as to be freely opened and closed with a view to facilitating replacement of the light sensitive sheet without troublesome procedures such as involved in the hitherto known structure in which the drum is taken out from the machine body by opening a front door for the replacement of the light sensitive sheet. Because of the arrangement such that the copy sheet P is discharged from the copying machine at a top portion thereof, means is provided to facilitate removal of a copying sheet jammed between a transfer station T and a discharging station E. There are disposed around the light sensitive drum various processing or treating means which are known per se. More particularly, reference letter A denotes a charging electrode including a corona discharge wire which serves to apply electric charge uniformly over the light sensitive member. At a station B, a light image of an original to be copied (not shown) illuminated by a lamp L disposed below the copy board is projected onto the light sensitive drum D through an optical system O including mirrors and a lens, thereby to eventually convert the uniform charge distribution into an electrostatic charge pattern corresponding to the original. A magnetic brush developing device C converts the electrostatic charge pattern into a visible image (toner image). In practice, a developer of a single-component system containing magnetic particles and resin as main components is used in place of a developer of a two-component. series consisting of carrier particles and toner particles. The inherent resistivity of the developer is selected higher than $10^{14}\Omega\cdot cm$ to assure a high quality of a copied image or transferred image. Composition of such developer is discussed in detail in the specification of Japanese Patent Application No. 99385/1974 filed in the name of the same applicant as the present application. The transfer station T includes an image transfer electrode assembly which is known per se and serves to transfer the toner image from the drum surface onto the transfer sheet P moving as superposed on the image zone of the light sensitive drum D. Letter F denotes separating means mounted on the drum D to be positioned between the transfer sheet P and the drum. Thickness, width and frictional resistance of such separating means are of course selected so that high quality transferring can be assured without involving any injury to the light sensitive surface. Letter G denotes a separating apparatus which comprises an electrically conductive roller grounded to earth, a transporting belt and a roller for promoting separation. The separating apparatus functions to electrostatically attract a portion of the transfer sheet P which is separated from the drum surface by the separating means thereby to remove the transfer sheet from the machine. A roller type fixation device H serves to melt and fix the toners deposited on the moving transfer sheet. At the discharging station E, the transfer sheet is discharged outwardly onto a tray I.

Figure 2:
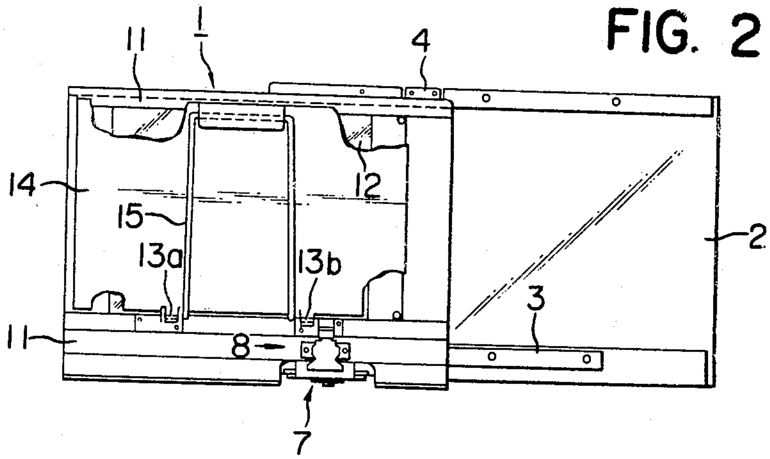
FIG. 2 is a top plan view of an electrophotographic copying apparatus incorporating a disengageable coupling mechanism for the original carriage according to the invention.
Figure 3:
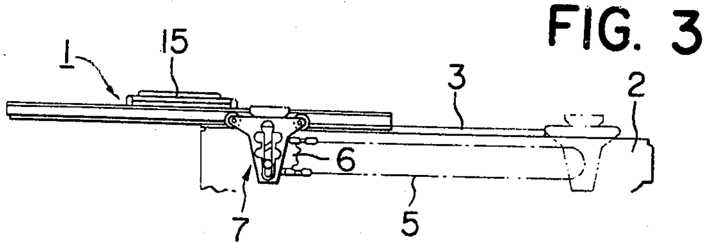
FIG. 3 is a side view showing a main portion of the copying apparatus.
Figure 4:
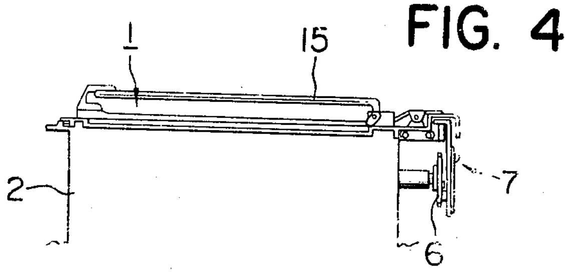
FIG. 4 is a side view showing another portion of the copying apparatus.

FIGS. 2, 3 and 4 show the copy board and a main portion of a driving mechanism therefor in a plan and side views. As described hereinbefore, the copy board 1 is constructed to be reciprocatably moved by a driving mechanism as guided through cooperation of a rail 3 and a guide 4 mounted on the top plane of the copying machine body 2 at opposite sides thereof.

The copy board 1 comprises a frame 11, a transparent glass plate 12 mounted horizontally on the frame 11 for supporting thereon an original to be copied and a platen cover 14 pivotally mounted on the frame 11 by means of hinges 13*a* and 13*b* so as to cover the top surface of the transparent glass plate 12. A cover pressing member 15 is additionally provided to press the platen cover 14 against the glass plate 12.

Figure 5:
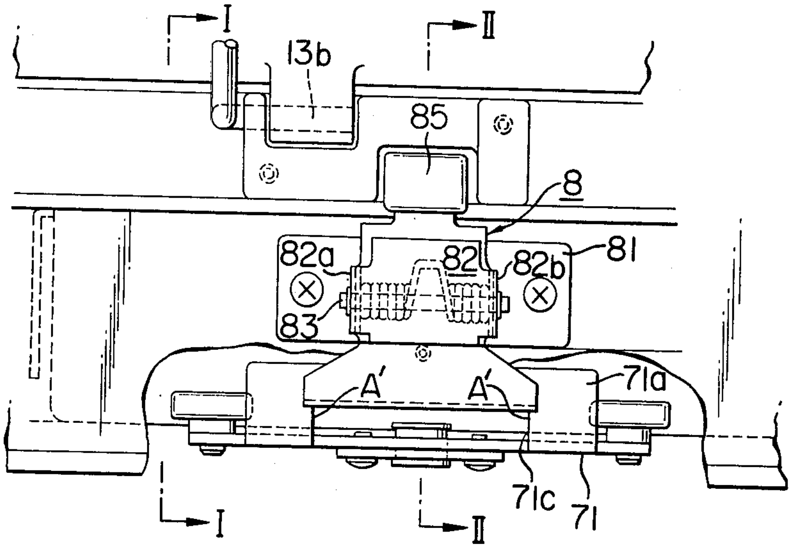
FIG. 5 is a plan view showing a disengageable coupling mechanism for an original carriage according to an embodiment of the invention.
Figure 6:
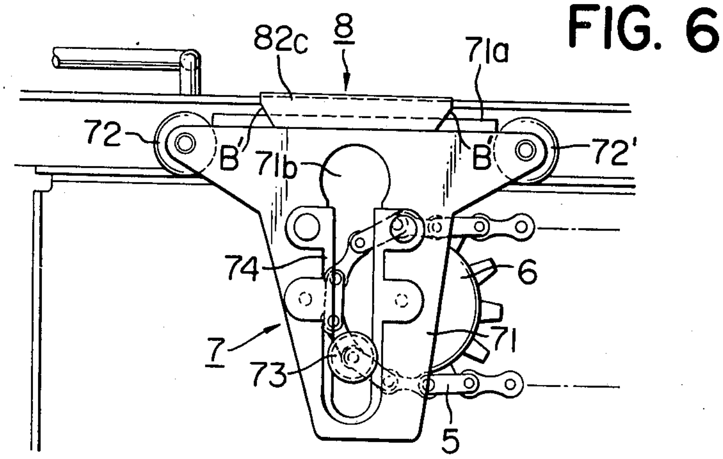
FIG. 6 is a front view of the same.
Figure 7:
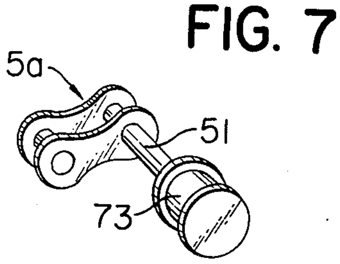
FIG. 7 is a perspective view of a link of a chain constituting a part of the coupling mechanism.
Figure 8:
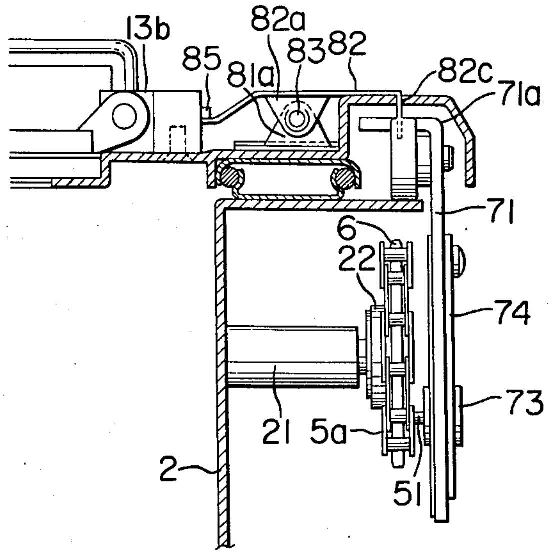
FIG. 8 is a sectional view taken along the line I—I in FIG. 5.

FIGS. 5 to 8 show in enlarged scales a disengageable coupling mechanism for disconnectably coupling the copy board 1 according to the teachings of the invention. The disengageable coupling mechanism includes intermediator means 7 for deriving movement transmitted to a suspension means such as sprocket 6 from a driving source (not shown) of the copying machine through an endless power transmitting means such as endless chain 5, and coupling means 8 for transmitting the movement of the intermediator means 7 to the copy board 1. Although only one sprocket is shown in the drawing, it will be appreciated that another sprocket is disposed along the path of the copy board 1 at a predetermined distance from the sprocket 6 (refer to FIG. 3). The intermediator means 7 is constituted by a T-like bar 71 having a horizontally extending bent portion 71*a*. A vertically extending slot 71*b* is formed in the T-like bar 71 at a center portion. A pair of rollers 72 and 72' are rotatably mounted on the top end portion of the T-like bar 71 at opposite sides so as to be constantly in contact with a horizontally extending member (not identified by a reference symbol) mounted on the top of the machine body 2. A guide member 74 is secured to the T-like bar 71 in alignment with the parallel side edges of the slot 71*b* by screws or like appropriate means. The guide member 74 serves to guide a roll 73 in a manner described hereinafter. The horizontally bent portion 71*a* of the T-like bar 71 has a rectangular aperture 71*c* formed therein, as is shown in FIG. 5. Referring to FIG. 7, the aforementioned roll 73 is mounted with play on a pair of pins or on an extension of one pin 51 of a chain link 5*a* which constitutes a part of the chain 5 and is engaged in the slot 71*b* formed in the T-like bar 71 and through the guide member 74. In order to prevent the roll 73 from being accidentally disengaged from the slot 71*b*, the diameter of the axially opposite end portions of the roll 73 are slightly enlarged. In place of the roll 73, the pin 51 may itself be used for the same purpose. In any case, since the roll or pin is brought into firctional contact with the guide member 74, these elements should preferably be made of a material exhibiting a small frictional coefficient such as a synthetic resin material.

It goes without saying that an endless timing-belt having a plurality of teeth and timing-pulleys to be meshed with the timing belt can be utilized for the chain and pair of sprockets. Next, description will be made of the coupling means 8.

Figure 9:
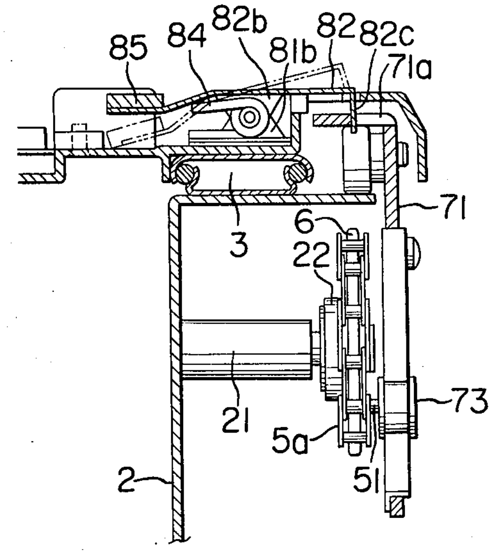
FIG. 9 is a sectional view taken along the line II—II in FIG. 5.
Figure 10:
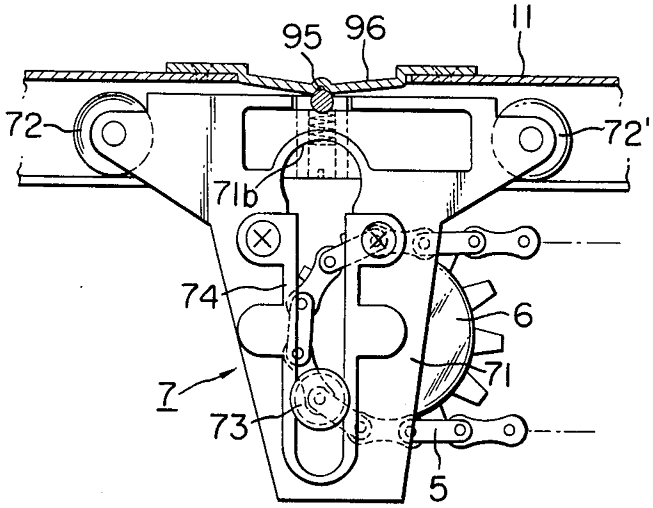
FIG. 10 is a front view showing another embodiment of the disengageable coupling mechanism according to the invention.
Figure 11:
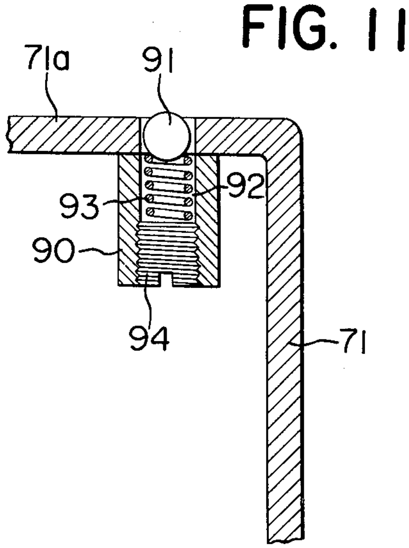
FIG. 11 is a sectional view showing a main portion thereof.

Secured on the frame 11 is a mounting plate 81 on which a pair of supporting pieces 81*a* and 81*b* each of a triangular shape are mounted in the erected state. On the other hand, depending pieces 82*a* and 82*b* each of a triangular shape are formed at opposite side edges of an engaging piece 82 having a point end portion bent perpendicularly. A pin 83 is inserted through the supporting pieces 81*a*, 81*b* and the depending pieces 82*a*, 82*b* thereby to install the engaging piece 82 on the mounting plate. It should be mentioned that the geometrical configuration of the supporting pieces 81*a*, 81*b* and the depending pieces 82*a*, 82*b* may be of any other shape, as long as the relationship described above can be established. Here, it should be noted that the coupling means can be mounted on the intermediator means instead of the copy board. A coil spring 84 is disposed around the pin 83 below the engaging piece 82 (refer to FIG. 9) and is previously so biased that the engaging piece 82 is urged forwardly as rotating about the pin 83 (in the clockwise direction as viewed in FIG. 8). A forwardly bent portion 82*c* of the engaging piece 82 (refer to FIGS. 8 and 9) is of a trapezoidal shape tapered downwardly, as can be seen from FIG. 6, and has a portion engaging in the aperture 71*c* formed in the horizontally bent portion 71*a* of the T-like bar 71 with slanted edges B' (FIG. 6) thereof being in contact with the openings A' (FIG. 5). A disengaging piece 85 is mounted behind the engaging piece 82 to rotate the latter in the counterclockwise direction against the biasing force of the coil spring 84. The disengaging piece 85 is positioned to be vertically swingable in a space defined by notches formed in a holding member of the hinge 13*b*. Engagement between the engaging piece 82 and the T-like bar 71 may be accomplished by making use of other physical relationships than that of the bent portion 82*c* and the opening 71*c*. For example, mounting means 90 may be disposed on a portion of the horizontally bent portion 71*a* of the T-like bar 71 with a ball 91 being inserted into a through-hole 92 of the mounting means 90, as is shown in FIGS. 10 and 11. The upper edge of the through-hole 92 is narrowed to limit or regulate the projection of the ball 91 to a predetermined degree. The ball 91 stands under the pressure of a spring 93 and is adjustable by means of a screw 94. Further, the contemplated engagement may be accomplished by providing the copy board with an engaging piece or latch means 96 having a groove or a recess 95 which is engaged by the ball 91.

When the engagement described above remains for some reason in the released state, it is preferred that the engagement by reestablished during movement of the drive system (the chain engaged with the T-like bar 71 in the case of the illustrated embodiment). To this end, a taper should be imparted to the engaging piece 96 in the moving direction of the copy board so that the engagement between the ball 91 and the recess or groove 95 formed in the engaging piece 96 can be automatically restored. Likewise in the case of the first-described embodiment, such automatic restoration can be easily attained by appropriately designing and selecting the force of the spring 84, the angle of the slanted edge of the engaging piece 82, the depth of engagement and like factors.

Next, description will be set forth concerning the operation of the disengageable mounting mechanism of the copy board 1. Normally, the engaging piece 82 of the coupling means 8 is in the state in which the forwardly bent portion 82*c* is engaged in the aperture 71*c* of the T-like bar 71 constituting a part of the intermediator means 7. Accordingly, the copy board 1 is coupled to the chain 5 and hence to the sprocket 6 through the roll 73. Assuming that the chain 5 is driven in the direction indicated by an arrow from a drive source of the copying machine (which usually serves also as the drive source for the rotating mechanism of the drum), the T-like bar 71 is displaced in the moving direction of the chain 5 by way of the roll 73 fixedly secured to the pin 51 of the chain link 5*a*, as a result of which the copy board 1 coupled to the T-like bar 71 is driven along the rail 3. When the copy board 1 and hence the T-like bar 71 are displaced to the right as viewed in FIG. 3, the roll 73 is positioned at a relatively upper position of the guide member 74 mounted on the bar 7 at the notch 71*b* thereof and maintained at this position during the movement. When the chain is moved along an arcuate path defined by the sprocket, the roll 73 causes the T-like bar to be displaced progressively to the right, while the roll 73 itself is moved along the arcuate path defined by the slot 71*b* to reach the bottom point below the sprocket (not shown). Subsequently, the roll 73 is moved to the left, whereby the copy board is caused to move in the reversed direction. Upon a further change in the moving direction, i.e. from the left to the right, the roll 73 is moved upwardly within the guide member 74 because the chain 5 is driven at a constant speed. In the meantime, the T-like bar 71 and hence the copy board 1 are caused to stop. In this manner, the copy board 1 is reciprocated in association with the revolution of the light sensitive drum through the chain 5. Concurrently, the original resting on the transparent glass plate 12 is illuminated.

Assuming now that replacement of a light sensitive sheet mounted on the rotatable drum under tension is required, the copy board 1 has to be moved to the home position (referred to as the zero position) at which no obstacle is encountered in the replacement of the light sensitive sheet. Under the circumstances, and irrespective of the then current position of the copy board 1 on the machine body 2, the disengaging piece 85 of the coupling means 8 is first depressed by a finger against the force of the coil spring 84 thereby to rotate the engaging piece 82 to the position indicated by a double-dotted broken line shown in FIG. 9 and to disengage the depending piece 82*c* thereof from the aperture 71*c* formed in the horizontally bent portion 71*a* of the T-like bar 71. As a consequence, the coupling means 8 is disconnected from the intermediator means 7, whereby the copy board is brought to the state freely movable relative to the driving mechanism therefor. Thus, the copy board can be manually moved slidably along the rail to the zero position. At this zero position of the copy board 1, the top plate (not shown) provided at the top of the machine body 2 can be opened to replace the light sensitive sheet with the drum being located in place. Moreover, replacement of a lamp L can be easily accomplished since the slit member (not identified by a reference symbol in FIG. 1) can be exposed in a facilitated manner.

In this connection, it is of course preferred that the top plate located above the lamp can also be opened. For recoupling the copy board 1 to the driving mechanism therefor after replacement of the light sensitive sheet, the process described above in conjunction with the disconnection of the copy board 1 is repeated in reverse order. That is, the copy board 1 is moved manually in the reverse direction along the rail 3 thereby to cause the depending piece 82*c* of the engaging piece 82 of the coupling means 8 to engage in the aperture 71*c* formed in the horizontally bent portion 71*a* of the T-like bar 71. Because the opposite side edges B of the depending piece 82*c* are slanted or inclined, the engaging piece 82*c* is allowed to engage with the side edges A of the aperture 71*c* in a wedge-like manner, as the result of which the coupling means 8 can be connected reliably to the intermediator means 7 in the same positional relationship as the one established before the disconnection. In other words, the copy board 1 can be connected to the driving mechanism in precisely the same positional relationship as existed before the disconnection. It should be noted that the slanted side edges B of the depending piece 82*c* of the engaging piece 82 play an important role for accomplishing the operation described above.

The copy board can of course be made freely movable relative to the driving mechanism for the transportation, packaging or like handling of the copying machine.

As will be appreciated from the above description, because the positional relationship between the coupling means 8 and the intermediator means 7 in the coupled state is made invariably, connection between the copy board and the driving mechanism can be released as desired, thereby to permit the copy board to be freely movable relative to the driving mechanism. When coulpled together, the same positional relationship between the copy board and the rotatable drum as the one prevailing before the disconnection can be accurately reestablished, involving no inconvenience in the reproduction of the original. In this way, the troublesome procedure as well as complicated structure which have been heretofore required for the replacement of the light sensitive sheet, transportation, packaging and design of the copying machine for removal of jammed conditions can be disposed of in a satisfactory manner. Furthermore, because the chain is used for driving the copy board, a much stabilized speed throughout the extent of movement of the copy board can be assured as compared with the case where a steel cord is used.

What is claimed is:

1. In an electrophotographic copying apparatus including a machine body and a copy board movable thereon along a path, suspension means on the machine body and comprising a pair of predeterminately spaced apart elements disposed along the path of the copy board, at least one of said elements being driven during operation of the copying apparatus, an endless power transmitting means suspended between said spaced apart elements of the suspension means for driven movement of the power transmitting means during operation of the copying apparatus, intermediator means including a closed vertical slot, engaging means on said power transmitting means for nonreleasable engagement in and movement along the vertical slot of said intermediator means such that driven movement of said power transmitting means causes said intermediator means to be carried by said engaging means reciprocatingly between said spaced apart elements of said suspension means, and coupling means between said intermediator means and the copy board for releasable coupled engagement therebetween so as to normally couple said intermediator means and the copy board for reciprocating movement of the copy board along the path when said suspension means is driven during operation of the copying apparatus.

2. In an electrophotographic copying apparatus according to claim 1, said coupling means being carried on the copy board, said intermediator means further including an aperture defined therein, and said coupling means including a bent portion and a spring for normally urging said bent portion into engagement with said intermediator aperture.

3. In an electrophotographic copying apparatus according to claim 2, said bent portion of the coupling means being predeterminately configured for automatic engagement with said intermediator aperture when said power transmitting means is driven to reciprocate said intermediator means while the copy board is in a state of disengagement from said intermediator means.

4. In an electrophotographic copying apparatus according to claim 1, said coupling means comprising a ball provided in said intermediator means and projecting therefrom to a predetermined extent, and latch means on the copy board for releasable engagement with said ball.

* * * * *